United States Patent
Williams et al.

(10) Patent No.: US 6,647,144 B2
(45) Date of Patent: Nov. 11, 2003

(54) DETECTION AND VERIFICATION OF SCANNING ATTRIBUTES

(75) Inventors: Leon C. Williams, Walworth, NY (US); Elizabeth A. Richenderfer, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 554 days.

(21) Appl. No.: 09/728,368

(22) Filed: Dec. 4, 2000

(65) Prior Publication Data

US 2002/0067850 A1 Jun. 6, 2002

(51) Int. Cl.⁷ .................................................. G06K 9/34
(52) U.S. Cl. ........................ 382/173; 382/168; 382/170; 382/282
(58) Field of Search ................................ 382/173, 180, 382/181, 224, 228, 282, 309, 318, 319, 168, 169, 170, 171; 358/1.9; 345/581

(56) References Cited

U.S. PATENT DOCUMENTS

| | | | |
|---|---|---|---|
| 5,086,485 A | 2/1992 | Lin | 382/51 |
| 5,751,848 A | 5/1998 | Farrell | 382/172 |
| 5,767,978 A * | 6/1998 | Revankar et al. | 382/173 |
| 5,835,628 A | 11/1998 | Farrell | 382/168 |
| 5,848,183 A | 12/1998 | Farrell | 382/172 |
| 5,881,166 A | 3/1999 | Farrell | 382/168 |
| 6,043,823 A * | 3/2000 | Kodaira et al. | 345/619 |
| 6,263,122 B1 * | 7/2001 | Simske et al. | 382/311 |

* cited by examiner

*Primary Examiner*—Phuoc Tran
(74) *Attorney, Agent, or Firm*—William Eipert

(57) ABSTRACT

A method for scanning a document includes: acquiring scanned image data from a first region of the document; determining an initial estimate of a document attribute using pixels in the first region; acquiring scanned image data from a second region of the document; processing pixels in the second region in accordance with the initial estimate; determining a second estimate of the document attribute using selected pixels in the second region; determining if the initial estimate is valid and if not, processing pixels within the image in accordance with the second estimate.

15 Claims, 3 Drawing Sheets

DETECTION AND VERIFICATION OF SCANNING ATTRIBUTES

BACKGROUND OF THE INVENTION

The present invention relates generally to systems and methods for scanning and processing documents. More specifically, the present invention relates to a method for scanning documents that identifies documents scanned with improper image characteristics.

In a conventional digital reproduction device, a document or image is scanned by a digital scanner which converts the light reflected from the document into electrical charges representing the light intensity from predetermined areas (pixels) of the document. The pixels of image data are processed by an image processing system which converts the pixels of image data into signals which can be utilized by the digital reproduction machine to recreate the scanned image. In other words, the image processing system provides the transfer function between the light reflected from the document to the mark on the recording medium.

One measure of the performance of a reproduction machine is how well the copy matches the original. Copy quality can be measured in many different ways. One way is to look at the characteristics of the reproduced image. An example of such a characteristic for determining the quality of the reproduced image is the contrast of the image. The contrast of an imaged (copied) document is one of the most commonly used characteristics for measuring quality since contrast provides a good overall assessment of the image's quality.

To assure high quality at the output printing device, it is desirable to know the contrast of the image being scanned prior to the image processing stage because, with this knowledge, the image processing system can process the image data so that the reproduced image has the proper contrast. Background detection processes provide one way of obtaining this contrast information prior to digital image processing.

Conventional automatic background detection processes generate a histogram of the document using standard methods, identify a background peak from the histogram and then calculate the mean and standard deviation. The standard deviation is then used to determine the gain factor for the document. The gain factor is used to estimate the background gray level of the image of the scanned document. The detected background can be removed by adjusting the gain of the scanned image and clipping the values that exceeds the system processing range.

Conventionally, background detection is performed by sampling pixel values either within a sub-region of the document (typically the leading edge) or across the whole document (page). Background detection based on leading edge generally provides superior throughput and system productivity because the background detection and background suppression can take place in a single pass. However, the image quality can suffer if the leading edge does not accurately reflect the average background for the entire document.

On the other hand, background detection based on data accumulated from pixel across the entire page provides a more accurate and robust determination of the background level. However, this process for background detection generally suffers form lower throughput rate as it requires two passes through the image data or an electronic memory to store the full image. That is, the process requires two scans, a first to collect data to determine the background level and a second to acquire image data taking into account background suppression Alternatively, background detection and data acquisition can be accomplished in a single pass of the scanning system with a second pass through the data to perform background suppression.

Therefore, it is desirable to utilize a system and method for scanning documents that maintains the productivity and throughput performance of "single pass" systems and the robust image quality of "two-pass" systems.

SUMMARY OF THE INVENTION

In accordance with one aspect of the present invention, there is provided a method for scanning a document. The method includes (a) acquiring scanned image data from a first region of the document; (b) determining an initial estimate of a document attribute using selected pixels from within the first region of the document; (c) acquiring scanned image data from a second region of the document; (d) processing pixels within the second region of the image in accordance with the initial estimate of the document attribute; (e) determining a second estimate of the document attribute using selected pixels from within the second region of the document; and (f) determining if the initial estimate is valid, and if not processing pixels within the image in accordance with the second estimate of the image characteristic

DETAILED DESCRIPTION OF THE INVENTION

Figure 1:
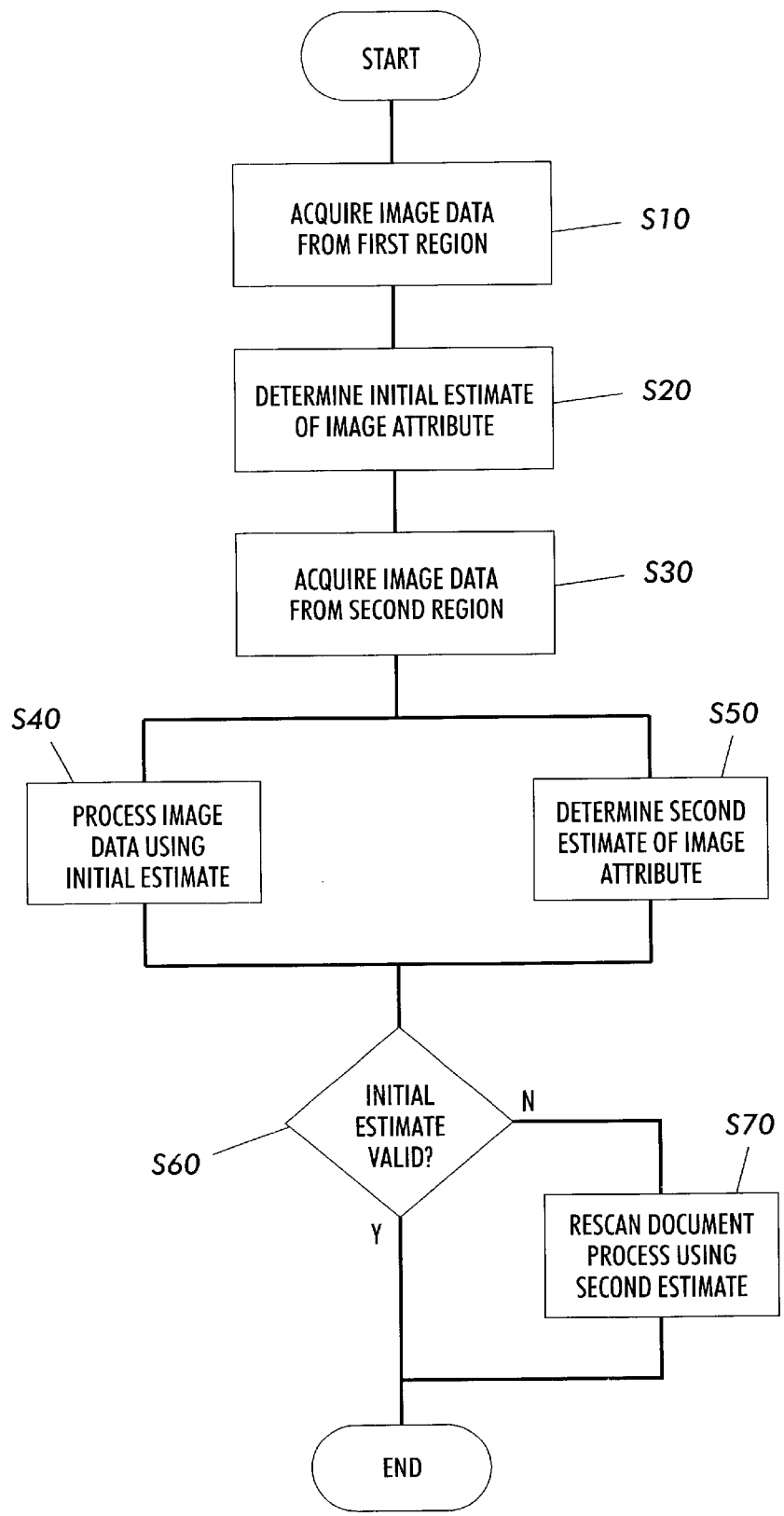
FIG. 1 is a flowchart illustrating an embodiment of scanning method according to the concepts of the present invention.

The following will be a detailed description of the drawings illustrating the present invention. In this description, as well as in the drawings, like referenced numbers represent devices, circuits, or equivalent circuits which perform the same or equivalent functions. While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Turning now to FIG. 1, there is shown a flowchart illustrating the steps in one embodiment of a scanning process in accordance with the present invention that reserves two pass scanning for those documents which are not satisfactorily processed with a single pass. Briefly, the process generates an initial estimate for one or more document attributes using image data from within a first region of the document that is anticipated to provide a representative sample of image data from which an estimate of the attribute can be determined for most documents (steps S10 and S20). The process proceeds with scanning the document and processing the image data using the initial estimate (steps S30 and S40). Additionally, the process generates a second estimate for the document attribute using selected pixels of image data from across the entire scanned document (step S50). Because the second estimate was generated using image data from across the document, it provides a more accurate estimate of the attribute. Using this second estimate of the attribute as a guide, the process determines if the initial estimate was valid (step S60). If so, the scanning process retains the scanned and processed data for that document and the scanning process is reset to begin the next document. If not, the process rescans (physically or from the memory buffer) the document using the second estimate (step S70) before the process is reset to begin scanning the next document.

More specifically, the process begins scanning the document to acquire video image data from a first region within the document at step 10. Beneficially, step S10 acquires image data from a region that is at or near the lead edge of the document passing the scanning sensor. In this manner the amount of acquired data that must be buffered pending the determination of any estimates of document attributes is minimized.

At step S20 selected pixels in the image data from the first region are examined to generate an initial estimate for one or more one document attributes useful for processing the scanned image data. That is, step 20 can generate an estimate for any measurable scanning or document attribute that affects image processing options and/or parameters. As noted above, one such attribute is the background of the scanned document. A similar attribute is the gray level value selected for thresholding. However, as will be appreciated, the invention may be used with any number of attributes. Moreover, it should be noted that when generating estimates for more than one attribute, the same region or set of pixels therein may support the generation of an initial estimate each attribute. Alternatively, each document attribute may be estimated using a different set of pixels.

Briefly reviewing, a conventional approach for determining the background value of a document compiles a histogram of the image values from a selected area of the document. As histogram data tends to be noisy, smoothing of the data is desirable. One approach to smoothing the histogram adds the frequencies in four adjacent bins, divides the sum by four and places the result in a new bin. In this manner a histogram with 256 bins is compressed into a histogram of 64 bins. The approximate shape of the histogram is estimated by defining a curve through at least three points including the frequency value in the bin with the highest occurrence frequency and the frequency values in the bins on each side of the bin having the highest occurrence frequency. Then, the standard deviation of the distribution curve of the compressed histogram is determined. Finally, the standard deviation is used to determine the gain factor from which the background gray level is determined.

Thresholding refers to the conversion of image data into binary data. To convert images into binary information, a single fixed threshold is often applied. If a pixel in the image is above a threshold level, a binary "1" is produced, otherwise, a binary "0" is produced. The selection of a threshold value is critical. Using a threshold value which is too high results in an unnecessary loss of information. Conversely, a threshold value which is too low brings out objectionable background noise. Conventionally, a threshold value is selected as the gray level value which is one-half the available dynamic range.

A more complete discussion of generating and utilizing histogram data and determining background levels and threshold and can be found in the following commonly owned US patents, which are incorporated by reference herein for their teachings: U.S. Pat. No. 5,086,485 entitled "Method and Apparatus for Dynamically Setting a Background Level" to Lin; U.S. Pat. No. 5,751,848 entitled "System and Method for Generating and Utilizing Histogram Data from a Scanned Image" to Farrell; U.S. Pat. No. 5,835,628 entitled "Method and System for Generating Histograms from a Scanned Image" to Farrell; U.S. Pat. No. 5,848,183 entitled "System and Method for Generating and Utilizing Histogram Data from a Scanned Image" to Farrell; U.S. Pat. No. 5,881,166 entitled "Method and System for Generating A Histogram of a Scanned Image" to Farrell.

Having generated initial estimates for one or more attributes at step 20, the process continues to acquire image data from the document at step S30. At step S40, the image data is processed in a conventional manner taking in to account the initial estimate of the attributes. That is, in the present example, a background suppression operation can be performed on the image data using the gain and background gray level estimated in step 20. The image data can also be converted into binary data using the estimated threshold from step 20.

In addition to the processing of step 40, selected pixels within the image data are sampled and used to generate a second estimate of the for the attributes at step S50. That is, step 50 samples pixels from throughout the document, compiles a histogram of the image values, smoothes the histogram data, identifies the background peak, estimates a curve defined by at least three points including the peak and frequency values from nearby bins and determines the standard deviation of the curve and the gain. In this manner, a second estimate that more accurately measures the background level of the document is generated. The second estimate is presumed to be a more accurate estimate for the entire document as it was derived using image data from across the document. In generating the second estimate, step S50 can build on the histogram values collected in step S20 or compile an entirely new histogram.

At step S60 the initial estimate from step S20 is evaluated to determine if it is a valid estimate for the document in view of the second estimate. One method to determine if it is a valid estimate is to compare the initial estimate of background value with the second estimate of background value. If the first estimate is within an acceptable (programmable) tolerance, the initial estimate may be considered as valid. This threshold might be based on an absolute difference between the estimates, a percentage difference of the initial or second estimate, or statistical difference such as the standard deviation. It should be appreciated that the comparison can be made between any number of related values as an alternative to or in addition to the background value. For example, the step can compare one or more of the bin having the peak value, the spread (standard deviation) of the distribution curve, the gain, etc. from the initial estimate with that of the second estimate to determine the validity of the initial estimate.

As an alternative to directly comparing estimates, step S60 may approximate the affect on the image of resulting form using the initial or second estimate. For example, referring to background value if the second estimate for the background level is darker than the initial estimate, step S60 can determine the number of pixels that would be effected (i.e., switched) using the darker background value. If the total number of effected pixels is small enough such that the impact on the image can be considered negligible the initial estimate may be considered as valid. The impact of the effected pixels on the image can be measured, for example, as a total number of effected pixels, as a percentage of the total number of pixels within the document, or as a percentage of the total number of image (non-background) pixels within the document (e.g., as a percentage of area coverage). Similarly, if the second estimate for the background level is lighter than the initial estimate, step S60 can approximate a number of effected pixels. Again, if the total number of effected pixels is small enough such that the impact on image can be considered negligible, the initial estimate may be considered as valid.

If step S60 determines that the initial estimate is valid, the scanning process retains the scanned and processed data for that document and the scanning process is reset to begin scanning the next document. If step S60 determines that the initial estimate was not valid, the process rescans the document using the second estimate (step S70) before the process is reset to begin scanning the next document. It should be appreciated that the rescanning of step S70 may be performed either mechanically or electronically. Mechanical rescanning refers to passing the document over the scanning sensor (or the scan sensor is over the document) a second time; while electrical rescanning refers to performing a second pass through the image data using a copy of the document stored in memory.

As discussed above, step S20 may be used to generate an estimate for any measurable scanning or document attribute that affects image processing options and/or parameters. Examples of measurable attributes affecting image processing which may be estimated in step S20 include, but are not limited to, measured reflectance (cavity calibration), show-through (image bleed from reverse side), color detection, color suppression, TRC calibration measurements, threshold for print, currency detection, anti-counterfeit detection.

In addition to estimating and verifying imaging attributes, the present invention can be expanded to perform two pass scanning when requested by a user or when required for performing selected processing options. With this operation, a document may include document processing instruction object such as a glyph, a bar code, or a similar pattern or image object that can be decoded to obtain information regarding processing options, job ticket information, processing instructions, etc. The present invention can be modified to include a processor capable of identifying and interpreting such information.

For example, glyphs may include instructions directing the system to use two pass scanning to process particular document. Additionally, the glyph may identify an option that requires a second scan. One such option may request the document be scanned to file and to print. Several factors including, memory, processing capacity, or bandwidth capacity may prevent this option form being completed with a single pass. The present invention may be used to initiate a second scan, thus allowing this instruction to be completed without requiring operator intervention to rescan or receiving a message indicating that the operation could not be completed.

The present invention is applicable in both a constant velocity transport (CVT) scanning environment well as in a platen scanning environment. When scanning from a platen, two passes over the document are required —a first pass over the document can collect data with the second pass, which can be used to collect data, required to position the sensor (platen) in the home position. When scanning from a platen in a high speed mode, the first pass can be used to collect image data with a return to home performed at a high speed as no data need be collected. With the present invention, a high speed the second pass will be replaced with a second pas to collect data if the initial attribute estimate are not valid for a given document.

Figure 2:
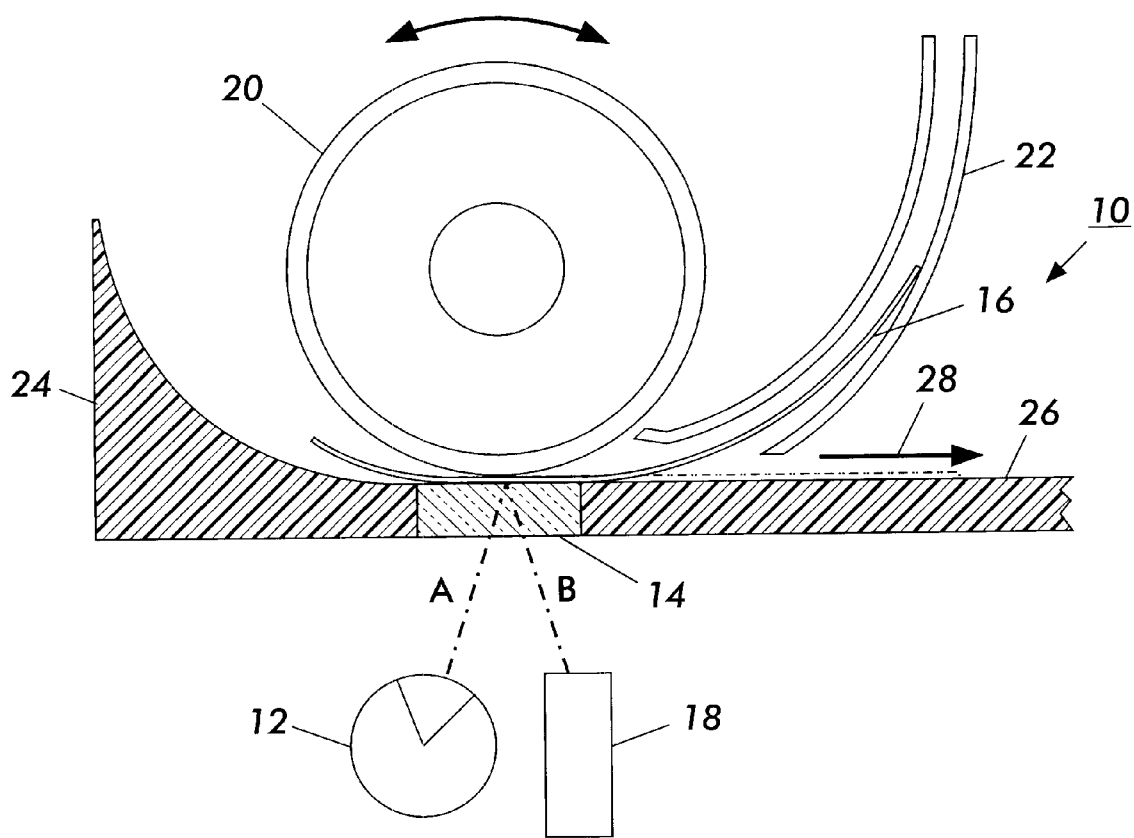
FIG. 2 illustrates an embodiment of constant velocity transport system operable in accordance with the present invention.

FIG. 2 illustrates a CVT system 10 operable in accordance with the teachings of the present invention. As illustrated in FIG. 2, light source 12 generates light A which passes through a small platen glass 14 and is reflected off document 16 as reflected light B which is then received by sensor 18. Document 16 is passed over sensor 18 (platen glass 14) by a reversible roller 20, which supports document 16 against or in close proximity to the platen glass. The CVT system further includes chute 22 to guide the original document to roller 20 and guide 24 directs the document away from roller 20. Chute 22 forms a one way gate with platen surface 26 such that as the trail edge of document 16 exits the chute, the beam strength of the paper brings the trial edge in contact with surface 26. In this manner, roller 20 can be reversed to back-up document 16 along surface 26 in the direction of arrow 28 to enable the system to mechanically rescan the document.

Figure 3:
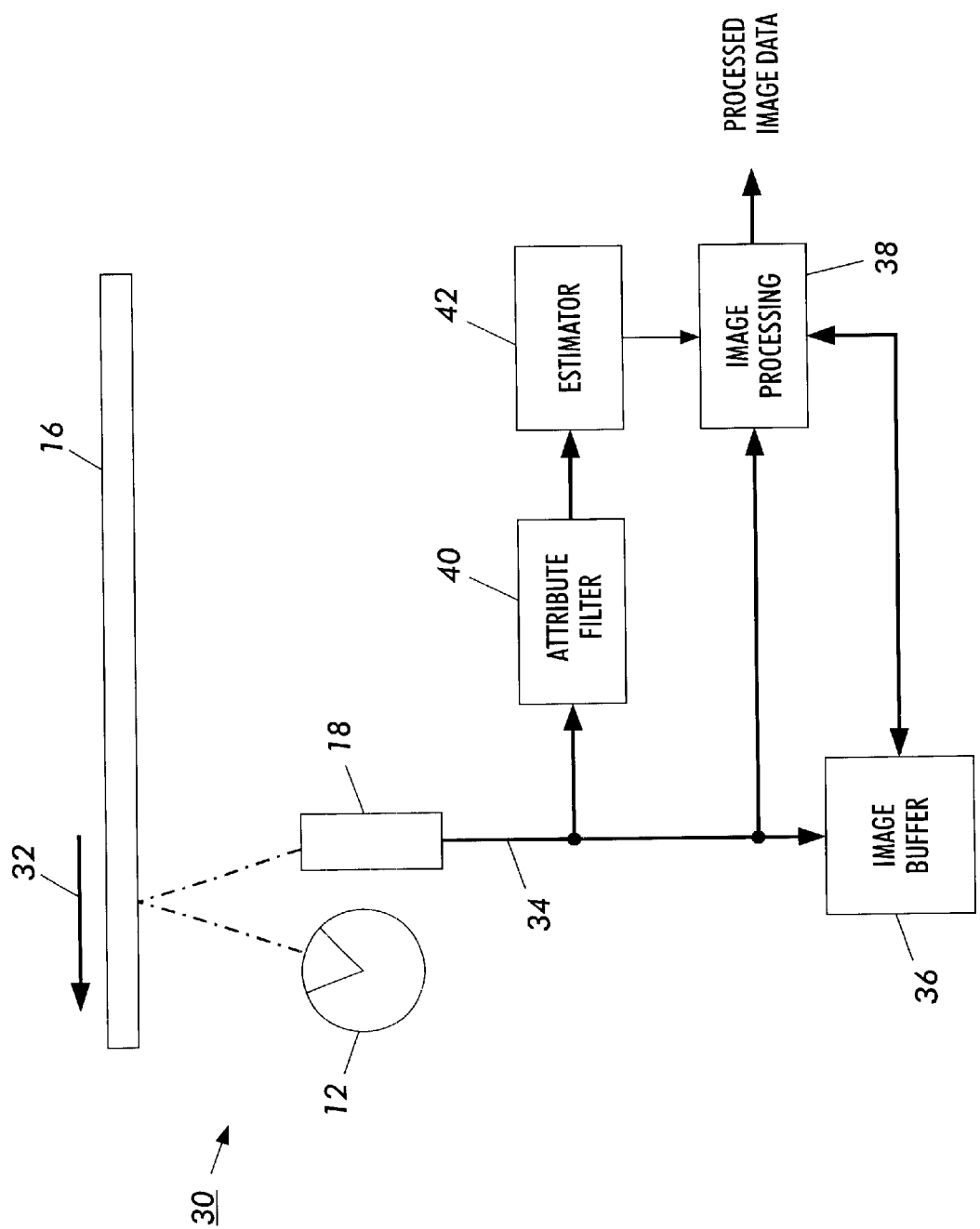
FIG. 3 shows an embodiment of system to perform an electronic rescan of documents in accordance with the present invention.

Referring now to FIG. 3, there is shown an embodiment of a system 30 for electronically rescanning of a document. The system of FIG. 3 can be used to electronically rescan document image data captured from either a platen or CVT system. In scanning system 30, an illumination device 12 provides illumination A which is reflected off of (or absorbed by) document 16 as reflected light B. This reflected light B is sensed by a photoelectric system 18 comprising electronic sensors which convert the light energy into electronic image data. The photoelectric sensor system ("sensors") 18 may be a charged couple device (CCD), a full width array sensor (FWA), or other photoelectric device which can operate in a black/white mode or a color mode. An electronic version of the actual image on document 16 is obtained by the relative movement of the document to sensors 18 in a direction of arrow 32. As previously mentioned, the relative movement can be obtained using either a CVT system or a platen.

As further illustrated in FIG. 3, the electronic video image data 34 captured by sensors 18 is supplied to image buffer 36, image processor 38 and attribute filter 40. Attribute filter 40 operates to acquire selected pixels of image data from within a first region of the document. After the all the selected pixels from within the first region are gathered, Attribute filter passes the image data to attribute estimator 42. Estimator 42 examines the pixels to generate an initial estimate for one or more one document attributes useful for processing the scanned image data. The estimate is passed to image processor 38 wherein the system proceeds with scanning the document and processing the image data using the initial estimate.

Additionally, attribute filter 40 operates to acquire selected pixels of image data from within a second region of the document. Estimator 42 generates a second estimate for the document attribute using the image data from the second within the scanned document. Using this second estimate of the attribute as a guide, image processor 38 determines if the initial estimate was valid. If so, the system retains the scanned and processed data for that document. If not, processor 38 retrieves video image data from buffer 36 and rescans the document by processing the video image data from buffer 36 using the second estimate.

It should be appreciated that there has been provided in accordance with the present invention, a method and apparatus to estimate image attributes such as background from image data near the lead edge of a document and proceed with the scanning and processing as though the initial estimate is correct. Additionally, as the document is scanned, the system continues to sample image data over the entire document and generates a second estimate for the attributes. Near the end of the scanning and processing of the document, the initial estimate may be compared to the second. If the two estimates are within an acceptable (programmable) tolerance, the processed image data from the first pass may be used without additional scanning. However, if the two estimates are not within an acceptable limit, the entire document may be rescanned and processed using the second estimate. This enables high productivity on most documents in which the initial estimate will closely match the second estimate. However, in those instances where the initial estimate was incorrect, the system rescans the document using the second estimate. Thus, the system limits two pass scanning and the resulting loss of productivity to those documents that really need it.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for scanning a document and processing the captured video image data, comprising:
   (a) acquiring scanned image data from a first region of the document;
   (b) determining an initial estimate of an image attribute using selected pixels from within the first region;
   (c) acquiring scanned image data from a second region of the document;
   (d) processing pixels within the second region in accordance with the initial estimate of the image attribute;
   (e) determining a second estimate of the image attribute using selected pixels in the second region of the document;
   (f) determining if the initial estimate is valid; and
   (g) if the initial estimate is not valid, rescanning the document and processing pixels within the rescanned document in accordance with the second estimate.

2. The method according to claim 1 wherein step (b) generates an estimate for at least one attribute from background, gray level threshold, measured reflectance and show-through.

3. The method according to claim 1 wherein:
   step (b) comprises the sub-steps (b1) generating a first histogram of gray-level values using the selected pixels from within the first region of the document and (b2) determining, from the histogram, a first gray value having a peak frequency associated with a background value; and
   step (e) comprises the sub-steps (e1) generating a second histogram of gray-level values using the selected pixels from within the second region of the document and (e2) determining, from the second histogram, a second gray value having a peak frequency associated with a background value.

4. The method according to claim 3 wherein step (f) determines the initial estimate to be valid if a difference between the first gray value and the second gray value is within a threshold.

5. The method according to claim 4 wherein the initial estimate is valid if the difference between the first gray value and the second gray value is less than 20 percent of the first gray value.

6. The method according to claim 4 wherein the initial estimate is valid if the difference between the first gray value and the second gray value is less than two times the standard deviation of the first gray value.

7. The method according to claim 3 wherein:
   step (b) further comprises the sub-steps of
      (b3) determining a distribution curve of the first histogram about the first gray value,
      (b4) determining a mean and standard deviation of the distribution curve from step (b3), and
      (b5) determining an initial background gray-level of the document based on the mean and standard deviation determined at step (b5); and
   step (e) further comprises the sub-steps of
      (e3) determining a distribution curve of the second histogram about the second gray value,
      (e4) determining a mean and standard deviation of the distribution curve of step (e3), and
      (e5) determining a second background gray-level of the document based on the mean and standard deviation determined at step (e5).

8. The method according to claim 7 wherein step (f) comprises:
   (f1) estimating a number of pixels that would be effected if the pixels within the second region of the image were processed in accordance with the second background gray-level;
   (f2) determining a comparison measurement using the estimate from step (f1); and
   (f3) comparing the comparison measurement to a threshold value to determine if the initial background gray-level is valid.

9. The method according to claim 8 wherein the comparison measurement identifies the estimated number of effected pixels as a percentage of the pixels within the document.

10. The method according to claim 8 wherein the comparison measurement identifies the estimated number of effected pixels as a percentage of the number of non-background pixels within the document.

11. The method according to claim 3 wherein step (e1) generates the second histogram of gray-level values by including the selected pixels from within the second region of the document in the first histogram.

12. The method according to claim 1 wherein the first region of the document is near a lead edge of the document.

13. The method according to claim 1 wherein the selected pixels from within the first region of the document and the selected pixels from within the second region of the document are mutually exclusive.

14. The method according to claim 1 wherein:
   step (a) acquires scanned image data for more than one color separation from the first region of the document; and
   step (b) determines the initial estimate of an image attribute using selected pixels from a first color separation.

15. The method according to claim 14 wherein step (b) further determines an initial estimate of a second image attribute using selected pixels from a second color separation.

* * * * *